(12) United States Patent
Hayashi

(10) Patent No.: US 6,225,004 B1
(45) Date of Patent: *May 1, 2001

(54) NICKEL POSITIVE ELECTRODE FOR ALKALINE STORAGE BATTERIES AND METHOD FOR PRODUCING THE SAME

(75) Inventor: Kiyoshi Hayashi, Toyohashi (JP)

(73) Assignee: Matsushita Electric Industrial Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,599

(22) Filed: Feb. 22, 1999

(30) Foreign Application Priority Data

Feb. 23, 1998 (JP) .................................................. 10-040708

(51) Int. Cl.⁷ ....................................................... H01M 4/32

(52) U.S. Cl. .......................... 429/223; 429/224; 429/232; 429/218.1

(58) Field of Search .................................. 429/223, 224, 429/232, 218.1

(56) References Cited

U.S. PATENT DOCUMENTS

| | | | |
|---|---|---|---|
| 4,985,318 | * | 1/1991 | Oshitani et al. ...................... 429/223 |
| 5,523,182 | | 6/1996 | Ovshinsky et al. .................. 429/223 |
| 6,083,642 | * | 7/2000 | Kato et al. ......................... 429/218.1 |

FOREIGN PATENT DOCUMENTS

| | | | |
|---|---|---|---|
| 56-84876 | * | 7/1981 | (JP) . |
| 58-75767 | * | 5/1983 | (JP) . |
| 61-110962 | | 5/1986 | (JP) . |
| 1-281670 | | 11/1989 | (JP) . |
| 2-234357 | | 9/1990 | (JP) . |
| 3-147258 | | 6/1991 | (JP) . |
| 4-160757 | * | 6/1992 | (JP) . |
| 6-103973 | | 4/1994 | (JP) . |
| 8-148146 | | 6/1996 | (JP) . |
| 9-330712 | * | 12/1997 | (JP) . |

* cited by examiner

Primary Examiner—Laura Weiner
(74) Attorney, Agent, or Firm—Akin, Gump, Strauss, Hauer & Feld, L.L.P.

(57) ABSTRACT

Disclosed is a nickel positive electrode which can best utilizes the effects of plural additives and exhibits a high capacity and a long cycle life. The nickel positive electrode contains a nickel hydroxide powder and a plurality of additives including cobalt oxide and a secondary additive, the secondary additive being encapsulated in a capsule of cobalt oxide.

3 Claims, 5 Drawing Sheets

NICKEL POSITIVE ELECTRODE FOR ALKALINE STORAGE BATTERIES AND METHOD FOR PRODUCING THE SAME

BACKGROUND OF THE INVENTION

The present invention relates to a nickel positive electrode for use in alkaline storage battery such as nickel-metal hydride storage battery, nickel-cadmium storage battery and so on, and a method for producing the same.

With the current rapid and wide spread of information equipment such as portable phone, PHS, notebook-type personal computer, etc., there is a serious demand for a secondary battery that has a high energy density and exhibits excellent performance as a battery even at high ambient temperatures due to heat generation by such equipment. There has been another demand for the development of a novel secondary battery with a high energy density as a power source for electric vehicle which can tolerate its use in a wide range of ambient temperatures. In order to answer such demand, a provision of a high capacity to the nickel-cadmium storage battery using a conventional sintered nickel positive electrode has been realized in the field of nickel-cadmium storage battery, and a nickel-cadmium storage battery having a high energy density including a foamed metal nickel positive electrode which has a 30 to 60% higher capacity than the former electrode has been developed. Furthermore, a nickel-metal hydride battery having a higher capacity than the nickel-cadmium storage battery which includes a hydrogen storage alloy as the negative electrode has also been developed.

The above-noted various high capacity alkaline storage batteries include a sintered porous nickel substrate, a three-dimensional foamed porous nickel substrate of high porosity (90% or more) or a porous nickel fiber substrate being filled with a nickel hydroxide powder at a high density. The use of such porous substrates has led to improvements of the energy density: Compared to 400 to 500 mAh/cm$^3$ of the conventional sintered nickel positive electrode, the recent sintered nickel positive electrode affords 450 to 500 mAh/cm$^3$ and the foamed metal nickel positive electrode affords 550 to 650 mAh/cm$^3$. In correspondence with realization of high capacities, the positive electrode has been improved in various characteristics such as utilization and performance at high temperatures with the wide use of a variety of additives. Under the circumstances, there have been previous proposals as follows:

(1) Incorporate a compound of an element selected from among yttrium, indium, antimony, barium and beryllium in the positive electrode (see Japanese Laid-Open Patent Publication No. Hei 6-103973).

Various additives other than the above have already been used in order to improve the battery performance. An addition of cobalt or a cobalt compound is the most widely applied method in order to improve the utilization of nickel hydroxide and there are many proposed methods for adding cobalt or a cobalt compound as follows:

(2) A method to coat a nickel hydroxide powder as active material with β-Co(OH)$_2$ (see Japanese Laid-Open Patent Publication No. Sho 61-110962);

(3) A method to adhere CoO or β-Co(OH)$_2$ particles to a nickel hydroxide powder active material by electrical charge and subsequently fix it thereon by mechanical impact (see Japanese Laid-Open Patent Publication No. Hei 1-281670); and (4) A method to form a layer of a cobalt compound having a valence larger than 2 which has a disordered crystal structure on the surface of nickel hydroxide (see Japanese Laid-Open Patent Publication No. Hei 8-148146).

The intended effects of the method (1) are to increase the oxygen evolution overvoltage as a competitive reaction against charge reaction at high ambient temperature by adsorption of a compound of yttrium, indium, antimony or the like onto the surface of the active material nickel hydroxide thereby improving charge efficiency and active material utilization at high ambient temperature.

This method, however, has a drawback that simple application of this method only does not offer the expected effects due to non-homogeneous distribution of the additive in the positive electrode. In order to have a prominent effect, the additive must be included in large amounts, which hinders realization of a high capacity battery.

The methods (2), (3) and (4) propose how to add cobalt in order to improve the utilization of nickel hydroxide. Those methods, however, are disadvantageous in that they require much labor in making Co(OH)$_2$ or CoO coated on or adsorbed onto the nickel hydroxide powder and have a very high production cost, which hinders industrial application of these methods.

Moreover, addition of cobalt or a cobalt compound has been applied separately apart from the addition of ZnO for improving storage characteristics of the resultant battery or the addition of the compound proposed by the method (1) and therefore there remains much room for improvement in terms of effective combinations of plural additives.

BRIEF SUMMARY OF THE INVENTION

In view of the above problems, the object of the present invention is therefore to provide a nickel positive electrode that has a high capacity and a long cycle life by efficient use of the effects of a plurality of additives.

The present invention provides a nickel positive electrode for alkaline storage batteries containing a nickel hydroxide powder as an active material and a plurality of additives including cobalt oxide and a secondary additive, the secondary additive being encapsulated in a capsule of cobalt oxide.

Here, the secondary additive is preferably at least one selected from the group consisting of metallic cobalt, metallic nickel and a compound of metallic element, and the metallic element is preferably selected from the group consisting of cobalt, nickel, manganese, zinc, calcium, magnesium, strontium, barium, yttrium, ytterbium, erbium, indium, antimony and beryllium.

The present invention also provides a method for producing a nickel positive electrode comprising the steps of mixing and kneading a paste of cobalt hydroxide with a secondary additive to form a cobalt hydroxide capsule encapsulating the secondary additive, mixing and kneading the cobalt hydroxide capsule encapsulating the secondary additive with a nickel hydroxide powder to make a paste of active material mixture, and filling the paste of active material mixture into an electrode substrate.

It is preferable for the method to further comprise a step of drying the capsule of cobalt hydroxide encapsulating the secondary additive before kneading it with the nickel hydroxide powder.

DETAILED DESCRIPTION OF THE INVENTION

Figure 1:
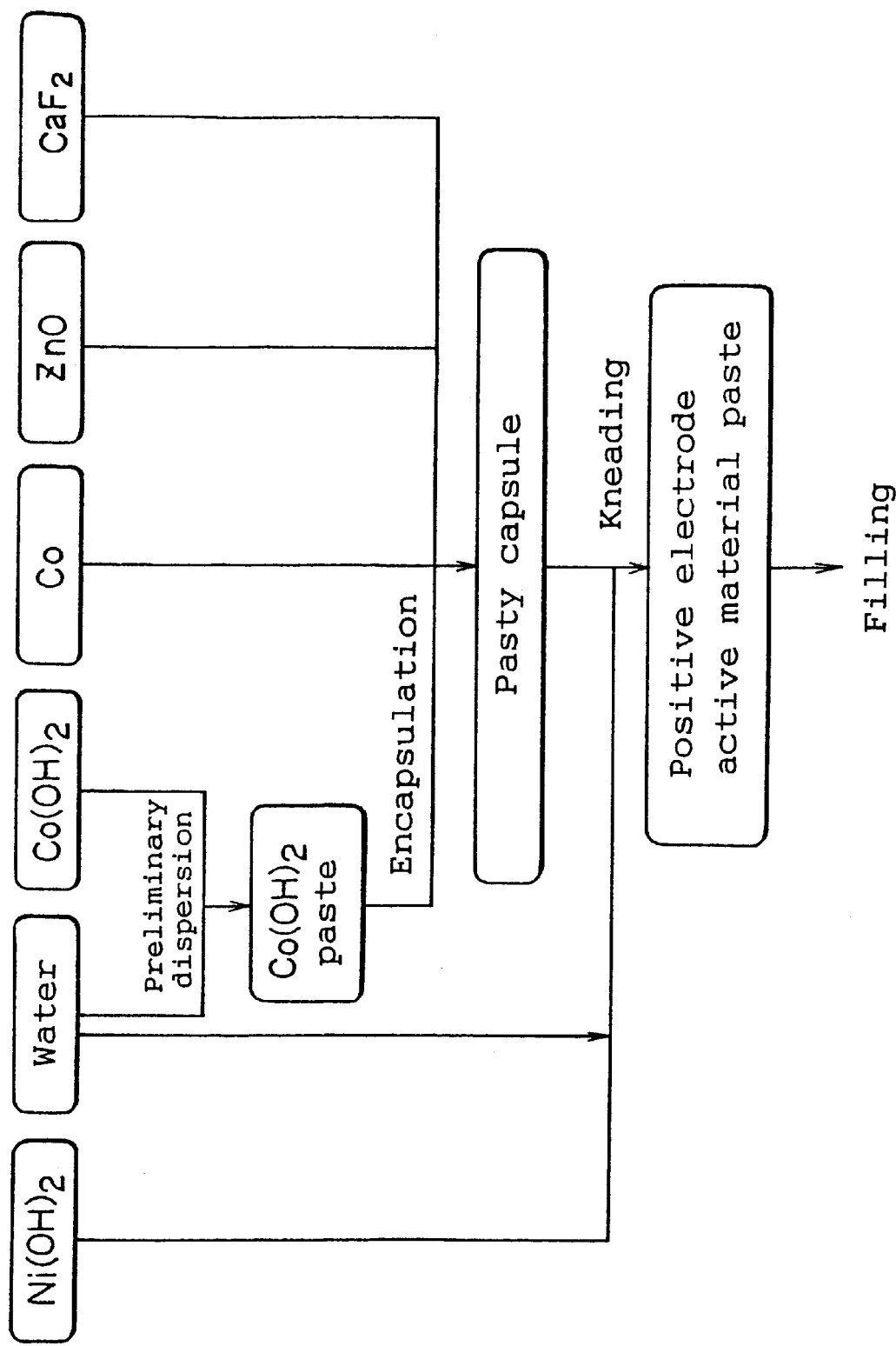
FIG. 1 is a chart illustrating the production steps of a nickel positive electrode of one example in accordance with the present invention.

The present invention is characterized by a nickel positive electrode comprising an active material mixture of nickel hydroxide as the active material with a primary additive cobalt oxide and other secondary additive and an electrode substrate supporting thereon the active material mixture, wherein the secondary additive is encapsulated in a cobalt oxide capsule.

The above-mentioned cobalt oxide is a higher cobalt oxide, preferably cobalt oxyhydroxide (CoOOH) which can function as a conductive network inside a workable electrode. The cobalt oxide may be pre-converted to a higher cobalt oxide when it is used at production of an electrode or may be converted later on to a higher cobalt oxide by initial charge after formation of electrode upon production or after assembling the electrode in a battery. For the latter case, cobalt hydroxide is usually used at production of electrode as the starting material cobalt oxide to be converted to the higher cobalt oxide.

As stated above, the secondary additive is encapsulated in a cobalt oxide capsule in which a variety of additives which have conventionally been added separately in order to improve electrode characteristics are integrated together and are present in close contact with the higher cobalt oxide of high conductivity. Such integrated structure of various additives is considered to promote or accelerate electrochemical reaction of the positive electrode compared to the prior art structure where individual additives are present diffusely inside the electrode. The structure also facilitates homogeneous distribution of the additives throughout the electrode without forming an aggregate of only a specific additive. Therefore, it is possible to have equal or exceeding effects of the additives even if their amounts are reduced.

In the following, the present invention will be described more specifically referring to the drawings.

Figure 2:
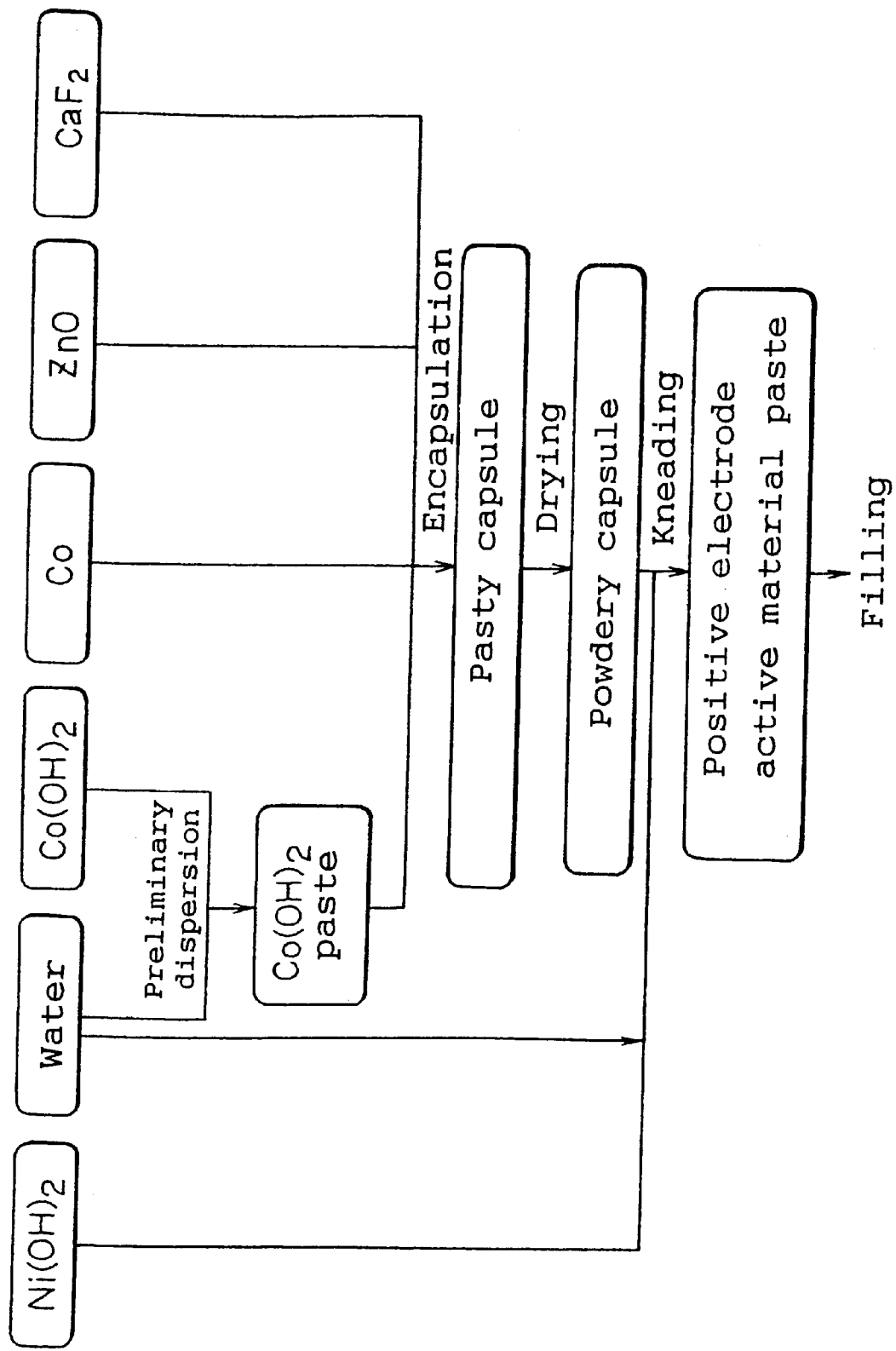
FIG. 2 is a chart illustrating the production steps of a nickel positive electrode of another example in accordance with the present invention.

Both FIG. 1 and FIG. 2 show the production steps of the nickel positive electrode in accordance with the present invention.

Explanation of FIG. 1: In the first step, water is added to a cobalt hydroxide powder and kneaded to make a viscous paste of cobalt hydroxide. In the next step, as secondary additives, a metallic cobalt powder, a zinc oxide powder and calcium fluoride are added to the cobalt hydroxide paste and kneaded. This gives a paste dispersed with capsules of the main additive cobalt hydroxide in which the secondary additives are encapsulated. To the resultant paste, a nickel hydroxide powder as the active material is added together with water and kneaded to make a paste of active material mixture.

Explanation of FIG. 2: The production steps shown in this figure differ from those of FIG. 1 in that the paste dispersed with the cobalt hydroxide capsules in FIG. 1 is dried, and the dried capsules are mixed with an active material nickel hydroxide powder and water and kneaded to make a paste of active material mixture. Drying the capsule ensures tight integration of the secondary additives inside individual capsules.

Figure 3:
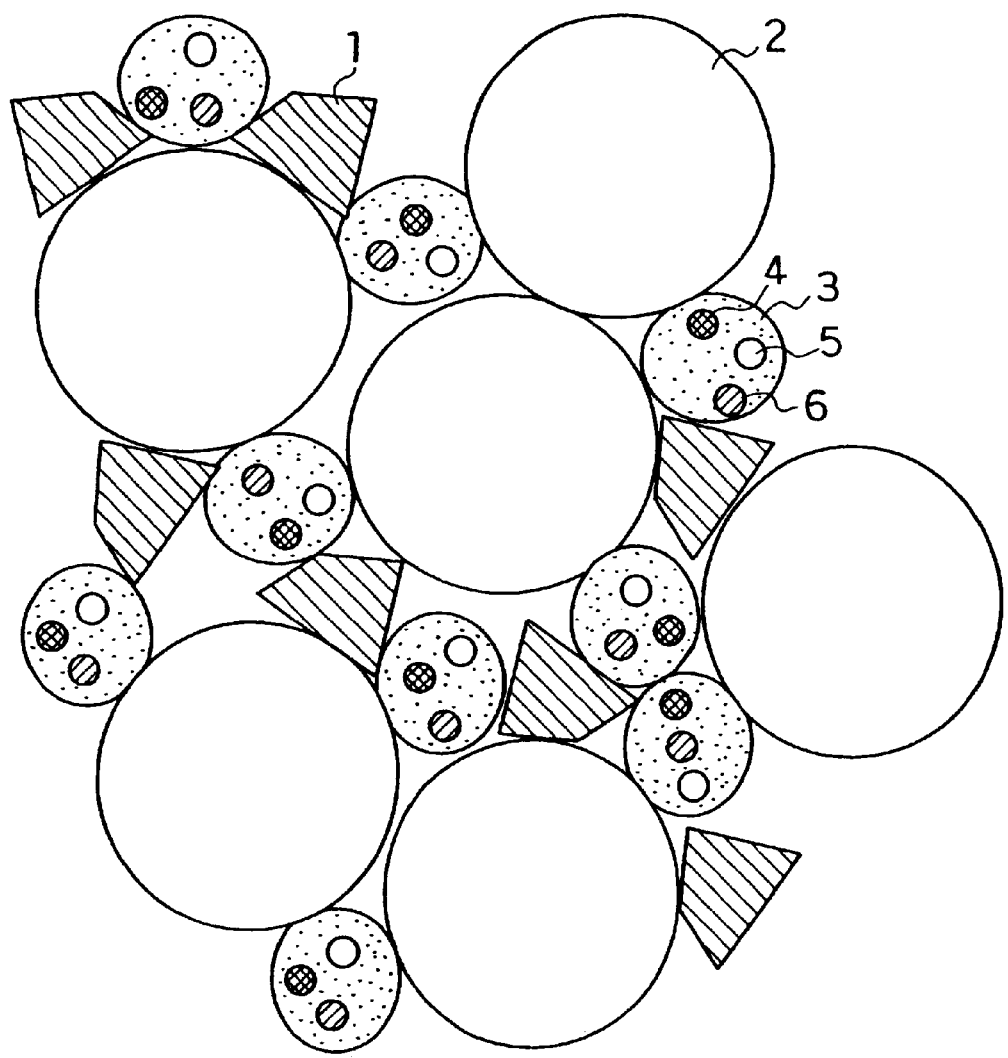
FIG. 3 is a schematic representation illustrating the structure of a nickel electrode in accordance with the present invention.

FIG. 3 schematically illustrates the structure of the nickel positive electrode of the present invention produced in the above-mentioned manner. Numeral 1 designates a core serving as electrode substrate, which corresponds to the skeleton of, for example, foamed nickel. The active material mixture filled into the core is composed of nickel hydroxide particle 2 and cobalt hydroxide capsule 3. In this figure, the capsule 3 encapsulates metallic cobalt particle 4, zinc oxide particle 5 and calcium fluoride particle 6 as secondary additives. The cobalt hydroxide is converted to a higher cobalt oxide by formation of electrode and/or by initial charge after fabrication of a battery and functions as a conductive network of the resultant electrode.

Figure 4:
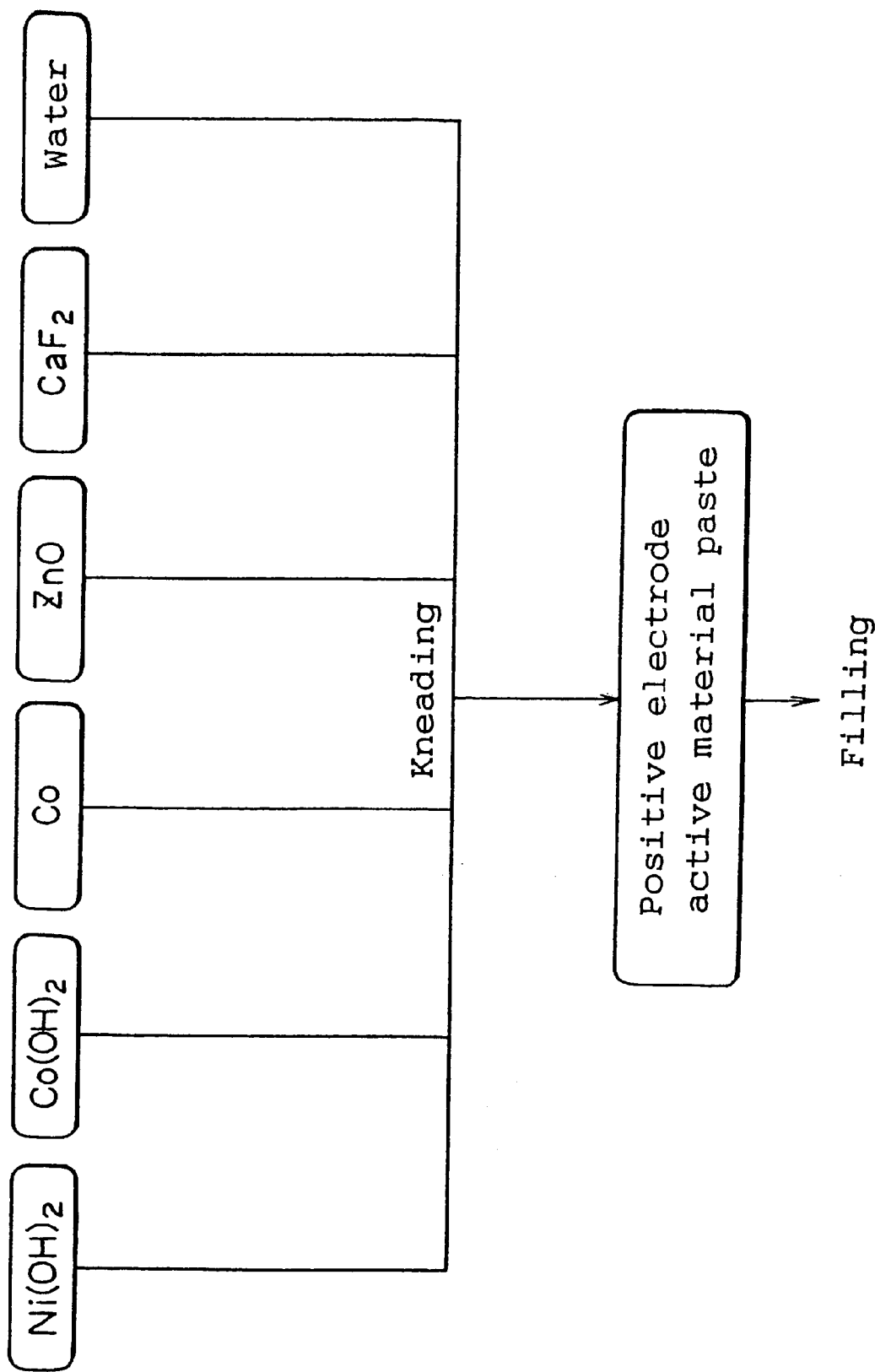
FIG. 4 is a chart illustrating the production steps of a conventional nickel positive electrode.

FIG. 4 shows the production steps of a conventional nickel electrode.

Figure 5:
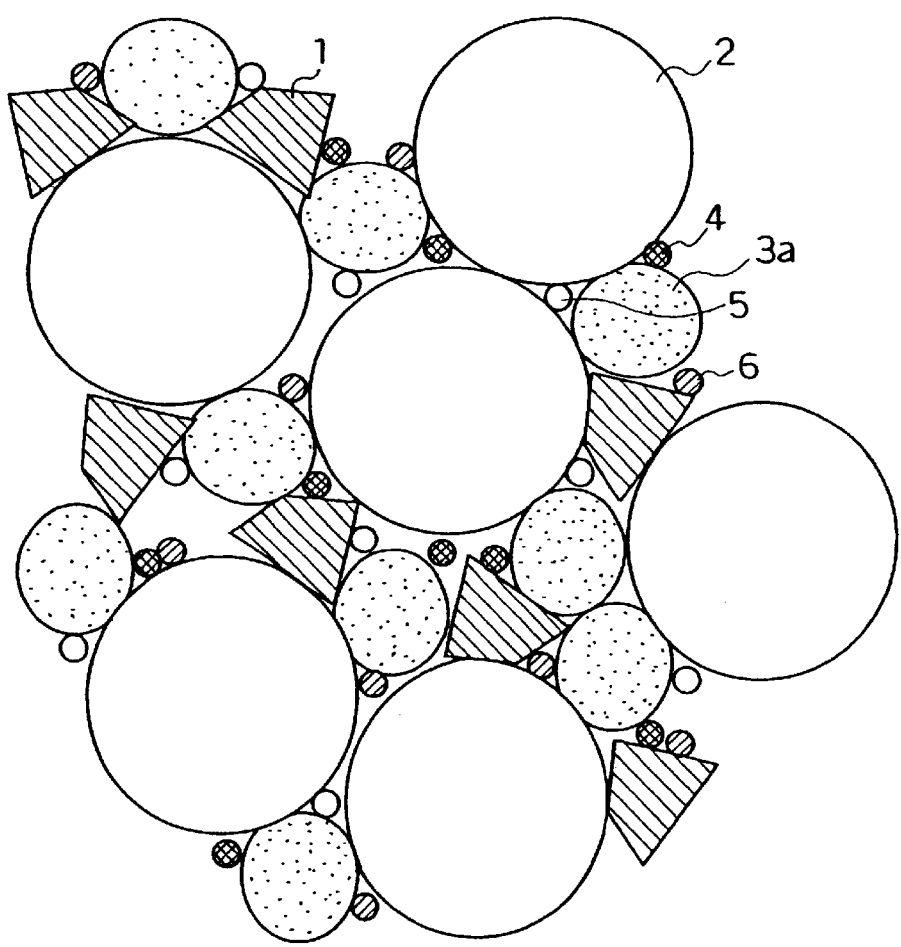
FIG. 5 is a schematic representation illustrating the structure of a conventional nickel electrode.

In the first step, a nickel hydroxide powder as the active material is mixed with various additives including cobalt hydroxide powder, metallic cobalt powder, zinc oxide powder and calcium fluoride powder together with water and the resultant mixture is kneaded to make a paste of active material mixture. In the next step, the paste is filled into an electrode substrate. FIG. 5 schematically illustrates the structure of the conventional nickel electrode thus produced. In the conventional nickel electrode, although there are several portions where some of the primary additive cobalt hydroxide particles 3a are in contact with secondary additive particles 4, 5 and 6, basically, individual additives are diffusely scattered separately among the nickel hydroxide particles.

Applicable additives to the present invention are not limited to the above-noted ones and a variety of additives which prove effective for this type of nickel electrode may also be applicable to the present invention. Of them, particularly preferred ones are ZnO and at least one selected from the group consisting of $CaF_2$, $Ca(OH)_2$ and $Y_2O_3$. The effect of the former is to improve the storage characteristics of the resultant electrode and the effect of the latter is to improve charge efficiency at high temperature.

As discussed above, according to the present invention, since plural additives are encapsulated in cobalt oxide, they can exert their intrinsic effects efficiently with smaller amounts than the conventional ones. As a result, the present invention can improve the utilization of the positive electrode active material at high temperature by reducing the contents of various additives and increase the filling amount of nickel hydroxide active material by the reduced amounts of additives.

In the following, the present invention will be described more specifically by way of concrete examples.

Additives to the nickel positive electrode used in the following examples are cobalt hydroxide powder, cobalt powder, zinc oxide powder and calcium fluoride powder and the ratio of these additives is 100:100:50:50 in weight ratio.

EXAMPLE 1

As shown in FIG. 1, water is added to a cobalt hydroxide powder to make a paste containing 67% water, which paste was mixed with a metallic cobalt powder, a zinc oxide powder and a calcium fluoride powder and kneaded so that these additives are encapsulated in a cobalt hydroxide capsule. The resultant capsule is pasty. To the pasty capsule, nickel hydroxide powder is added together with water and kneaded to make a paste of active material mixture containing 30% water. The mixing ratio of the nickel hydroxide to the additives is 20:3 in weight ratio.

EXAMPLE 2

As shown in FIG. 2, the pasty capsule of cobalt hydroxide encapsulating the additives prepared in Example 1 was dried at 100° C. for 2 hours, which gave a dried cobalt hydroxide capsule encapsulating the additives. The dried capsule is mixed with a nickel hydroxide powder and water and kneaded to make a paste of active material mixture containing 30% water. The mixing ratio of the nickel hydroxide to the additives is 20:3 in weight ratio.

Comparative Example

As shown in FIG. 4, a nickel hydroxide powder was mixed with a cobalt hydroxide powder, a metallic cobalt powder, a zinc oxide powder and a calcium fluoride powder at 2,000:100:100:50:50 in weight ratio. Water was added to the resultant mixture to make a paste of active material mixture.

Each of the positive electrode active material pastes of Example 1, Example 2 of the present invention and Comparative Example was filled into an electrode substrate, that is, foamed porous nickel substrate having a porosity of 95% and a surface density of 300 g/cm$^2$, dried, pressed, and cut to a predetermined size of 0.5 mm thickness, 35 mm width and 110 mm length, which gave a nickel positive electrode having a theoretical capacity of 1,000 mAh.

Then, each of the positive electrodes thus produced was assembled in a sealed nickel-metal hydride battery of AA size having a theoretical capacity of 1,000 mAh whose electric capacity is regulated by the positive electrode. The structure of the battery thus produced is shown in FIG. 6. In the figure, numeral 10 designates an electrode group. The electrode group is a spiral combination of negative electrode 11 made of a hydrogen storage alloy represented by the formula MnNi$_{3.6}$Co$_{0.7}$Mn$_{0.4}$Al$_{0.3}$ where Mm is an abbreviation of Misch metal and nickel positive electrode 12 which was produced in the above-mentioned manner, with a sulfonated polypropylene separator being interposed therebetween, and is accommodated in case 14 as a negative terminal. After pouring an alkaline electrolyte (2.0 cm$^3$) prepared by dissolving lithium hydroxide at 20 g/l in an aqueous potassium hydroxide solution having a specific gravity of 1.3 over the electrode group, the case 14 was sealed with a sealing plate 16 mounted with a safety vent 18 and a terminal 19. Numeral 15 designates an insulating plate for insulating the case 14 from the electrode group, numeral 17 designates a gasket, and numeral 20 designates positive current collector for electrically connecting the positive electrode 12 and the sealing plate 16.

Each of the batteries was tested by charge with a current of 0.1 C at ambient temperatures of 25, 35, 45 and 55° C. for 15 hours, followed by a 3-hour rest at 25° C. and subsequent discharge with a current of 0.2 C at 25° C. until the voltage dropped to 1.0 V. Table 1 lists the discharge capacity at the second cycle at each testing temperature in each battery tested by charge/rest/discharge cycles under the above conditions.

TABLE 1

| | Discharge capacity (mAh) | | | |
| --- | --- | --- | --- | --- |
| | 25° C. | 35° C. | 45° C. | 55° C. |
| Example 1 | 980 | 965 | 920 | 890 |
| Example 2 | 975 | 965 | 935 | 905 |
| Comparative Example | 950 | 920 | 750 | 500 |

As apparent from Table 1, in the batteries including the positive electrodes of Example 1 and Example 2 in accordance with the present invention, the discharge capacity at various ambient temperatures is improved compared to that of Comparative Example.

Then, each battery was tested by consecutive charge and discharge cycles at various ambient temperatures of 25, 35, 45 and 55° C. under the conditions of charge with a current of 1 C for 1.3 hours and subsequent discharge with a current of 1 C until the voltage dropped to 1.0 V, and the time point when a drop in discharge capacity to 40% of initial discharge capacity was observed was defined as the end of battery life. Table 2 lists the cycle life of each battery determined in this way.

As evident from Table 2, the batteries including the positive electrodes of Example 1 and Example 2 in accordance with the present invention are elongated in cycle life at various ambient temperatures compared to Comparative Example.

TABLE 2

| | Cycle life (cycles) | | | |
| --- | --- | --- | --- | --- |
| | 25° C. | 35° C. | 45° C. | 55° C. |
| Example 1 | 800 | 775 | 750 | 720 |
| Example 2 | 805 | 780 | 750 | 725 |
| Comparative Example | 550 | 520 | 495 | 400 |

These batteries were then stored for 1 month at an ambient temperature of 65° C. to examine the change in internal resistance and recovery of the capacity.

Capacity recovery ratio was calculated from the discharge capacities measured at 25° C. before and after storage, using the following equation. The results are shown in Table 3.

Capacity recovery ratio (%)=100×discharge capacity after storage (Ah)/discharge capacity before storage (Ah)

TABLE 3

| | Internal resistance (mΩ) | | |
| --- | --- | --- | --- |
| | Before storage | After storage | Capacity recovery ratio (%) |
| Example 1 | 30 | 32 | 100 |
| Example 2 | 32 | 33 | 101 |
| Comparative Example | 28 | 50 | 93 |

As is clearly seen from Table 3, the storage characteristics are improved in the batteries including the positive electrodes of Example 1 and Example 2 in accordance with the present invention compared to Comparative Example.

The data also indicate enhanced effects of the additives of cobalt, zinc oxide and calcium fluoride on the battery characteristics by the method of addition of the present invention, compared to those obtained by the conventional method.

In the foregoing examples, although cobalt oxide, zinc oxide and calcium fluoride were used as the additives, it is obvious that the present invention can increase the additive effects even with the use of other additives than the above-mentioned additives compared to the prior art.

As discussed above, according to the present invention, it is possible to provide a nickel positive electrode for alkaline storage batteries that can give a high capacity in a wide range of temperatures, a longer cycle life and excellent storage characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A nickel positive electrode for alkaline storage batteries containing a nickel hydroxide powder and a plurality of additives including cobalt oxide and a secondary additive, said secondary additive being encapsulated in a capsule of cobalt oxide.

2. The nickel positive electrode for alkaline storage batteries in accordance with claim 1, wherein said secondary additive is at least one selected from the group consisting of metallic cobalt, metallic nickel and a compound of metallic element, said metallic element being selected from the group consisting of cobalt, nickel, manganese, zinc, calcium, magnesium, strontium, barium, yttrium, ytterbium, erbium, indium, antimony and beryllium.

3. The nickel positive electrode for alkaline storage batteries in accordance with claim 2, wherein said compound of metallic element is selected from the group consisting of NiO, $MnO_2$, ZnO, $Zn(OH)_2$, CaO, $Ca(OH)_2$, $CaF_2$, $CaSO_4$, MgO, $Mg(OH)_2$, $MgSO_4$, $Sr(OH)_2$, $Ba(OH)_2$, $BaSO_4$, $Y_2O_3$, $Y(OH)_3$, $Yb_2O_3$, $Er_2O_3$, $In_2O_3$, $Sb_2O_3$, BeO and $Be(OH)_2$.

* * * * *